UNITED STATES PATENT OFFICE.

CHARLES J. GADD, OF STEELTON, PENNSYLVANIA.

FRICTION-CLUTCH.

No. 856,692.     Specification of Letters Patent.     Patented June 11, 1907.

Application filed April 3, 1906. Serial No. 309,648.

*To all whom it may concern:*

Be it known that I, CHARLES J. GADD, a subject of the King of Great Britain, residing at Heagy Heights, Steelton, in the county of Dauphin and State of Pennsylvania, have invented new and useful Improvements in Friction-Clutches, of which the following is a specification.

My invention relates to friction clutches of the type, in which the friction is applied to the hub of a wheel to be driven, by a split ring, bushing or band spread apart by a sliding wedge. The disadvantages experienced with clutches of this kind now in use are: that as soon as the friction surfaces of the wheel-hub and the split ring, bushing or band wear off, the latter must be entirely renewed, causing considerable expense in fitting a new ring to the wheel hub, shaft etc. and loss of time due to stoppage of machinery connected with the driving wheel, while such repairs are being made.

The object of my invention is to overcome these objectionable features and to provide means whereby the wear on the friction surfaces may almost instantly be taken up or readjusted, and to provide a friction clutch, which is not only reliable, simple and easily adjusted but which also will transmit the power of the shaft directly to the part to be clutched without the intervention of numerous mechanical parts.

My invention consists of a friction-clutch comprising a driving-shaft, a hub of a wheel to be driven, a friction surface on said hub, friction cheeks surrounding the driving shaft, a wedge sliding on a key and said shaft and means for shifting said wedge.

My invention further consists of the improvements hereinafter set forth and pointed out in the claims.

Figure 1:
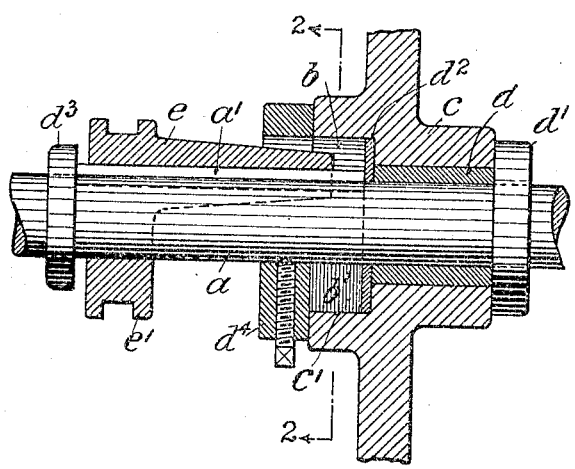
Figure 2:
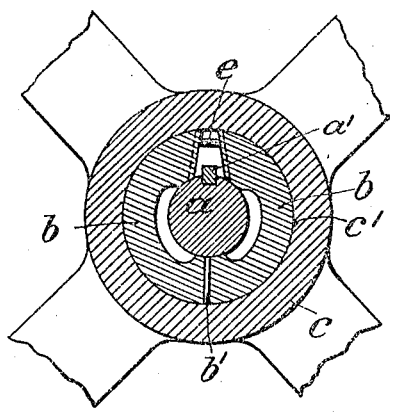
Figure 3:
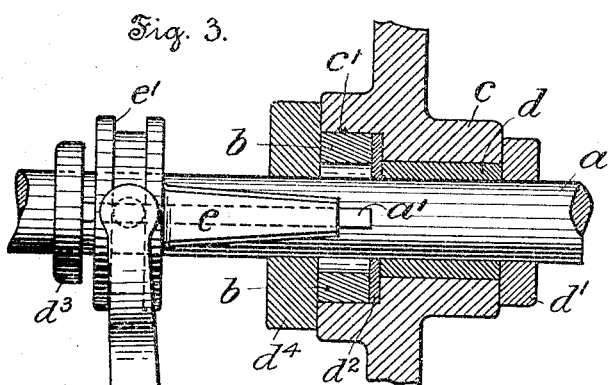
Figure 4:
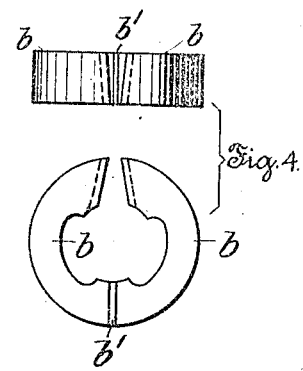
Figure 5:
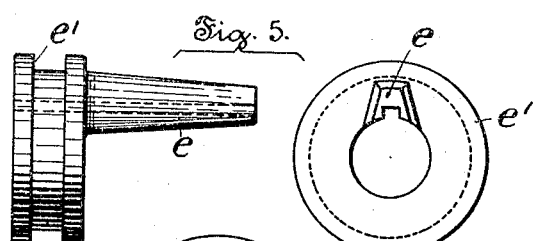
Figure 6:
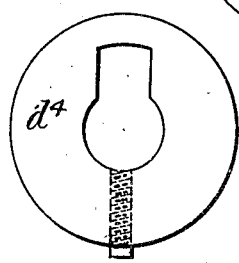

My invention will be more fully understood taken in connection with the accompanying drawings forming part hereof, and in which Figure 1 is a sectional view of my improved clutch, showing a shaft, the hub of a wheel running loosely on a bushing between two collars, a key in said shaft, friction cheeks, a wedge for spreading said cheeks, and means for sliding said wedge on said shaft and key. Fig. 2. is a section on line 2—2 of Fig. 1, showing the shaft and key, the wheel-hub the friction cheeks, a packing for said cheeks and the wedge for spreading said cheeks. Fig. 3 is a sectional view similar to Fig. 1, but showing the other side of the wedge. Fig. 4, are side and top views of the friction cheeks. Fig. 5 are front and side views of the sliding wedge, and, Fig. 6 is a view showing a collar adapted to hold the loose wheel-hub in place.

Referring now to the drawings for a further description of my invention, $a$ is a shaft driven from any suitable source, $c$ is a hub of a wheel, or other body to be driven intermittently by said shaft $a$; between the hub $c$ and the shaft $a$ may be located a bushing $d$, and a collar $d^1$ is secured to the shaft $a$ to guide the hub $c$ laterally. In the hub $c$ is formed a circular recess to provide a frictional surface $c^1$, and in this recess and surrounding the shaft $a$ are located the two friction-cheeks $b$ (Figs. 1, 2, 3, and 4). The two cheeks $b$ forming a sectional ring are provided at one of their ends with a packing piece $b^1$ for a purpose to be presently described, while the other ends are beveled in two directions as plainly shown in Figs. 2 and 4.

The shaft $a$ is key-seated and provided with a key $a^1$ extending into the recess of the hub $c$ and butting with one end against a collar $d^2$, while the other end of the key $a^1$ is held by a collar $d^3$ serving also as stop for the sliding-wedge $e$. This wedge $e$ is provided with a grooved collar $e^1$ surrounding the shaft $a$, and a longitudinal groove or key-seat fitting the key $a^1$; the wedge $e$ is tapering in two directions as shown in Figs. 2, 3 and 5, to register with the beveled ends of the friction-cheeks $b$.

The wedge $e$ may be shifted by any suitable device as $s$, to spread the beveled ends of the friction-cheeks $b$ apart and to bring the latter into close contact with the friction-surface $c^1$ of the hub $c$, to cause the latter to be rotated with the shaft $a$, or to disengage the friction-cheeks $b$ from contact with the said friction-surface $c^1$ of the hub $c$, as will be fully understood by those versed in the art to which my invention appertains.

From the foregoing and Figs. 1, 2 and 3, it will be seen that the power to be transmitted from the shaft $a$ to the hub $c$ is directly and through the friction-cheeks, and that portion of the key $a^1$, which extends into the recess of the hub $c$, so that no member of the device is subjected to bending or twisting.

Should the friction-surfaces of the hub and cheeks $b$ wear off so that the wedge $e$ cannot perform its function properly, a slightly thicker packing piece $b^1$ is inserted between the ends of the friction cheeks $b$, by sliding the collar $d^4$, set-screwed to the shaft $a$ and forming a guide for the hub $c$, backward, and re-setting the collar $d^3$ after the insertion of a new packing piece $b^1$, an operation which will occupy only a few minutes.

Having thus fully described the nature and objects of my invention, what I claim as new and desire to secure by Letters Patent is:

The combination, with a pulley loosely mounted on a shaft, of a friction surface in the hub of said pulley, two friction cheeks surrounding said shaft and adapted to be brought into contact with said friction surface, a radial end and a beveled end on each of said friction cheeks, a shifting collar keyseated to said shaft, a wedge formed integral with said collar and adapted to engage the beveled ends of said friction cheeks, and a packing piece between the radial ends of the said friction cheeks, substantially as and for the purposes set forth.

CHARLES J. GADD.

Witnesses:
M. R. ALLEMAN,
HERMANN BORMANN.